United States Patent [19]

Ito et al.

[11] Patent Number: 4,523,241
[45] Date of Patent: Jun. 11, 1985

[54] HEAD SHIFT MECHANISM IN A MAGNETIC TAPE APPARATUS

[75] Inventors: Yukio Ito; Kazuki Takai; Satoshi Takagi, all of Tokyo, Japan

[73] Assignee: Clarion Co., Ltd., Tokyo, Japan

[21] Appl. No.: 391,069

[22] Filed: Jun. 22, 1982

[30] Foreign Application Priority Data

Jun. 24, 1981 [JP] Japan .................................. 56-96734
Jun. 25, 1981 [JP] Japan .................................. 56-97571

[51] Int. Cl.³ .............................................. G11B 5/54
[52] U.S. Cl. ..................................... 360/105; 360/75; 360/96.4
[58] Field of Search ................................ 360/104–106, 360/109, 88, 96.3–96.5, 90, 75; 242/206, 209

[56] References Cited

U.S. PATENT DOCUMENTS 4,167,764  9/1979  Hanajima ........................ 360/105 X
4,393,426  7/1983  Nakanishi ........................... 360/105
4,403,265  9/1983  Okada et al. ..................... 360/105 X
4,425,591  1/1984  Ito et al. ............................. 360/88

Primary Examiner—John H. Wolff
Attorney, Agent, or Firm—Flynn, Thiel, Boutell & Tanis

[57] ABSTRACT

A head shift mechanism in a magnetic tape apparatus includes a rotatably driven gear, a movably supported engaging member intermittently engageable with the gear, and a cam member which is operatively coupled to and moves simultaneously with the engaging member. A movably supported changeover member is cooperable with and moves in response to movement of the cam member, and a selectively actuable arrangement causes the gear to drivingly engage the engaging member. A movably supported operating member has a magnetic head thereon, and the changeover member can cause a movably supported control member to move the operating member to an advanced position. A lock arrangement is provided to releasably lock the control member in a position where it holds the operating member in the advanced position, and selectively actuable release arrangement is provided for releasing the lock arrangement.

5 Claims, 9 Drawing Figures

HEAD SHIFT MECHANISM IN A MAGNETIC TAPE APPARATUS

FIELD OF THE INVENTION

This invention relates to a head shift mechanism in a magnetic tape apparatus.

BACKGROUND OF THE INVENTION

Conventionally, to perform head shifting actions like press-fitting/releasing action, auto-reverse action, etc. by using a cam to be driven in response to rotation of a motor, the driving force of the cam has been directly transmitted to an operating member for shifting the head by directly linking the operating member to the cam.

Such a conventional mechanism, however, has drawbacks such as that the head stops in an insecure position while shifting if the power source is interupted to stop the motor during a press-fitting action of the head by the cam and that if a user wants to do stop operation, fast-forwarding operation, rewinding operation or eject operation, he has to wait until the action for press-fitting the head is completed because forcible operations often damage heads, etc.

OBJECT OF THE INVENTION

It is therefore an object of the present invention to overcome the above mentioned drawbacks in the prior art by providing a head shift mechanism in a magnetic tape apparatus capable of cancelling power transmission between an operating member for shifting a head and a cam even during a head shifting action.

SUMMARY OF THE INVENTION

The objects of the invention are met by providing, in a head shift mechanism which includes a rotatably driven gear, a movably supported engaging member intermittently engageable with the gear, a cam member which moves simultaneously with the engaging member, a movably supported changeover member which moves in response to movement of the cam member, a selectively actuable arrangement which causes the gear to drivingly engage the engaging member, and a movably supported operating member which has a magnetic head thereon, a moveably supported control member which can move the operating member to an advanced position in response to movement of the control member, a lock arrangement which can releasably lock the control member in a position where it holds the operating member in its advanced position, and a selectively actuable release arrangement for releasing the lock arrangement.

DETAILED DESCRIPTION OF THE PREFERRED EMBODIMENTS

Figure 1:
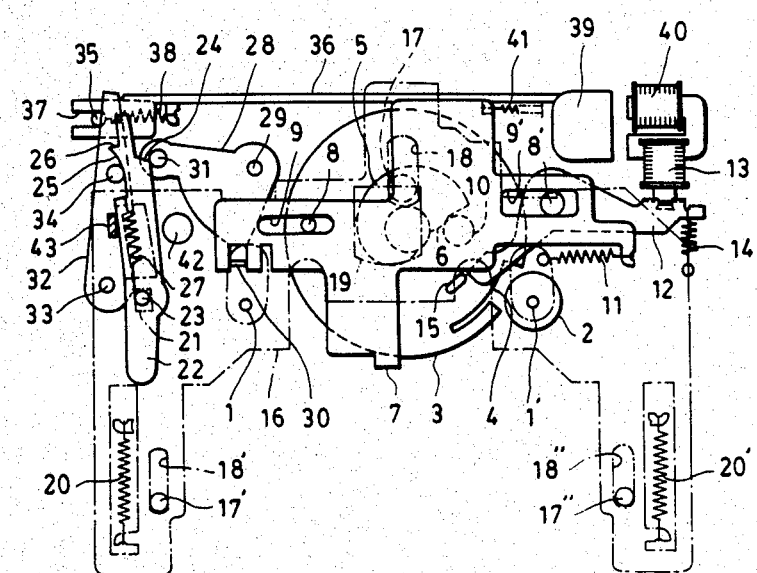
FIG. 1 is a plan view of a head shift mechanism embodying the present invention.

The present invention will now be described in detail referring to the preferred embodiments illustrated in the drawings.

FIG. 1 to 6 show an embodiment applied to action for press-fitting a head. In the description related to these and sequent drawings, wordings like "up", "down", "right", "left", etc. mean directions in the drawings. Reference numerals 1 and 1' each denotes a capstan mounted on a fixture frame not shown. Reference numeral 2 refers to a gear coaxially mounted with the capstan 1' for integral rotation with a motor not shown, and 3 to an engaging member or intermittent gear mounted on the fixture frame and having a toothed portion which is interrupted by a cut-out portion 4 and which can be in meshing engagement with the gear 2. Reference numeral 5 refers a cam integrally formed on the intermittent gean 3 and having a step portion 6 at the radial edge thereof. Reference numeral 7 designates a changeover member having elongated holes or slots 9 and 9' which are in engagement with guide pins 8 and 8' provided on the fixture frame, permitting the changeover member to move in right and left direction. Numeral 10 refers to a roller (or a pin) provided on the changeover member 7 for engagement with the cam 5, and 11 to a spring leftwardly energizing the changeover member 7. The force of the spring 11 causes the roller 10 to get in contact with the cam 5. As shown in FIG. 1, when the intermittent gear 3 is so positioned as to be out of engagement with the gear 2, the roller 10 is in contact with the step portion 6 of the cam 5, so that the force of the roller 10, which is going to move leftward, energizes the intermittent gear to rotate to counter-clockwise toward a position for engaging with the gear 2. Against this force, a stopper member 12 keeps the intermittent gear 3 at the position as shown in FIG. 1. The stopper member 12 is pivotally supported by the guide pin 8' and is positioned as shown in FIG. 1 due to the tensile force of a spring 14 while a release plunger 13 mounted on the fixture frame is deenergized, whereby stopper member 12 engages a protuberance 15 formed on the intermittent gear 3 to thereby make the intermittent gear 3 stay there.

Figure 2:
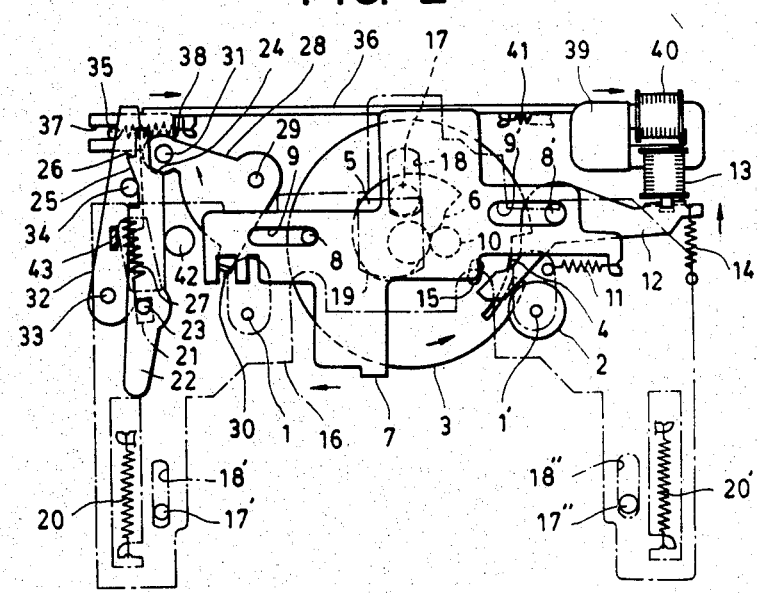
FIG. 2 is a plan view similar to FIG. 1 showing the embodiment of FIG. 1 in a different position of operation.

Reference numeral 16 denotes an operating member having a stroke limit hole or slot 18 and elongated holes or slots 18' and 18" which are in engagement with guide pins 17, 17' and 17", respectively so that the operating member 16 may move in up and down directions up to the limited stroke. Numeral 19 refers to a head mounted on the operating member 16, and 20 and 20' to springs for upwardly energizing the operating member 16. When the lowermost end of the stroke limit hole 18 is in contact with the guide pin 17, the head 19 is in a released or retracted condition. Numeral 21 refers to a slightly longitudinally elongated hole formed in the operating member and 22 to a control member pivotally supported by its supported point 23 which is supported in the hole 21 for up and down movement. The control member 23 has a slanting surface 24 formed at the upper and right side thereof and a downwardly slanting surface 25 as well as an upwardly slanting surface 26 both formed at the upper and left side thereof. Numeral 27 designates a spring for upwardly energizing the supported point 23 of the control member 22 toward the operating member 16. The spring force of the spring 27 is larger than those of the springs 20 and 20', so that when the control member 22 is in an upper position as shown in FIGS. 1 and 2, of course, and also when it is pushed downward as shown in FIG. 3, the supported point 23 is kept contacting the uppermost end of the hole 21 until the uppermost end of the stroke limit hole 18 gets in contact with the guide pin 17 so as not to let the operating member 16 shift downwardly any more.

Figure 5:
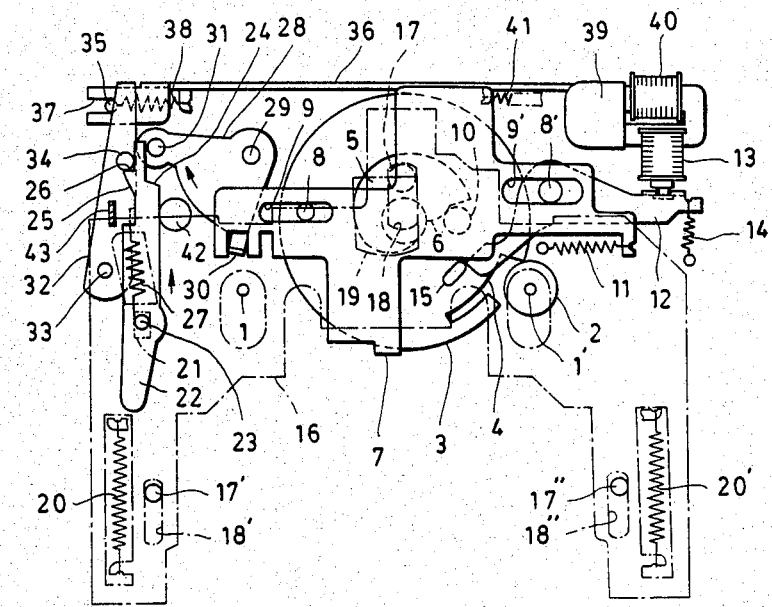
FIG. 5 is a plan view similar to FIG. 1 showing the embodiment of FIG. 1 in an additional position of operation.

Numeral 28 is a sector member pivotally supported on the fixture frame. The sector member 28 has an engage portion 30 which is in engagement with the leftmost slit of the changeover member 7 so that, in response to right and left movement of the engage portion 30 due to movement of the changeover member 7, a protuberance 31 formed on the sector member 28 and in engagement with the slanting surface 24 of the control member 22 moves upward and downward. Numeral 32 is a lock member pivotally supported by its supported point 33 on the fixture frame. The lock member 32 has a protuberance 34 for engaging with the slanting surfaces 25 and 26 and has an engage portion 35 formed at the upper portion thereof. Numeral 36 refers to a holding member, 37 to a hole formed at the leftmost end of the holding member 36 for engagement with the engage portion 35 of the lock member 32, 38 to a spring for energizing the engage portion 35 toward the right and lower end of the hole 37 and rightwardly with respect to the holding member 36, 39 to a movable core provided at the rightmost end of the holding member 36 for cooperation with a holding plunger 40 mounted on the fixture frame, and 41 to a spring for rightwardly energizing the holding member 36 so as to urge the movable core 39 toward the holding plunger 40. The spring force of the spring 38 is larger than that of the spring 41, so that when the movable core 39 is attracted by the holding plunger 40 as shown in FIG. 5 and when the protuberance 34 of the lock member 32 is in contact with the upward slanting surface 26 of the control member 22 to prevent upward movement of the control member 22, the spring force of the spring 38 holds that locked condition, while when the holding plunger 40 is deenergized, the lock member 32 rotates in the anti-clockwise direction against the force of spring 41 to thereby release the locked condition.

Figure 3:
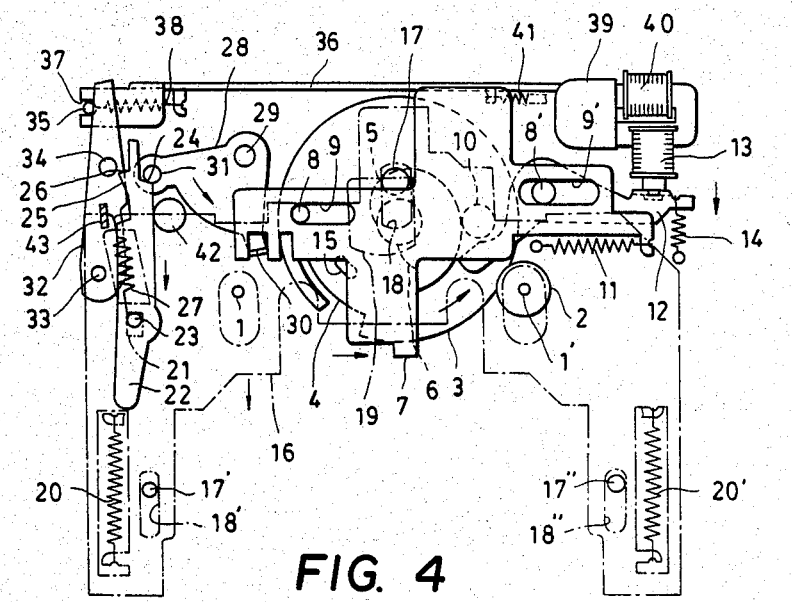
FIG. 3 is a plan view similar to FIG. 1 showing the embodiment of FIG. 1 in another position of operation.
Figure 6:
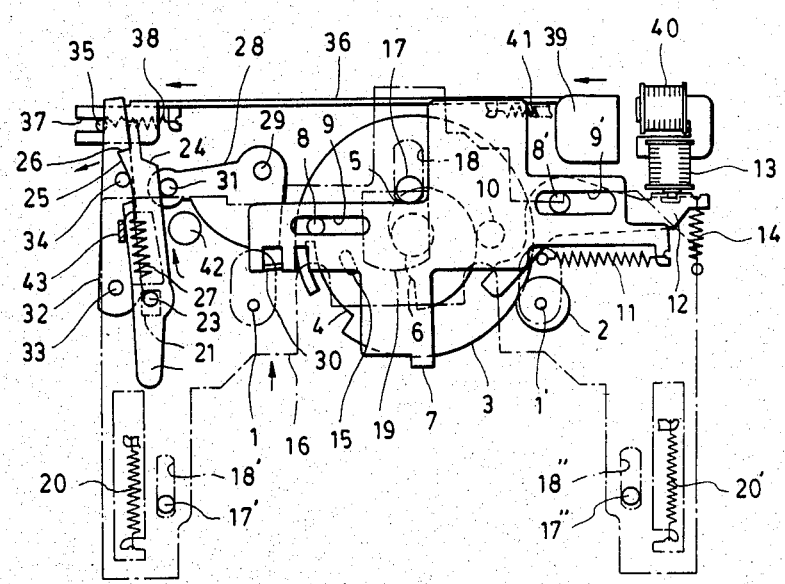
FIG. 6 is a plan view similar to FIG. 1 showing the embodiment of FIG. 1 and yet another position of operation.

Numeral 42 refers to a stopper provided on the fixture frame for restricting clockwise rotation of the control member 22, and 43 to a limit plate also provided on the fixture frame for limiting anti-clockwise rotation of the control member 22 in order to prevent it from rotating in the anti-clockwise direction with the lock member 32 even after the slanting surface 24 of the control member 22 moves away from the protuberance 31 of the sector member 28 while the control member 22 moves from the position shown in FIG. 3 to the position shown in FIG. 6, which may make it difficult for the upward slanting surface 26 to move away from the protuberance 34 of the lock member 32.

The system constructed as above functions as follows. First, the system is in the state as shown in FIG. 1 while it stands still. When a cassette, for example, is thereafter inserted, the release plunger 13 is energized to cause the stopper member 12 to rotate in an anti-clockwise direction to thereby move away from the protuberance 15. Then, the roller 10 pushes the step portion 6 due to tensile force of the spring 11 and it moves to the left while rotating the cam 5 in an anti-clockwise direction. Due to rotation of the cam 5, the intermittent gear 3 which is integral with the cam 5 rotates in the same direction to get in meshing contact with the gear 2 which is made to rotate in a clockwise direction by the motor. On the other hand, due to leftward movement of the changeover member 7, due to leftward movement of the roller 10, the protuberance 31 of the sector member 28 moves upward to thereby move away from the right lateral surface of the control member 22 to a location above the slanting saurface 24, so that the control member 22 can rotate in a clockwise direction. Thus, the control member 22, lock member 32 and holding member 36 move in a clockwise direction and to the right due to tensile force of the spring 41 to cause the movable core 39 to be attracted and held by the holding plunger 40 (ref. : FIG. 2).

The intermittent gear 3 which is in meshing engagement with the gear 2 rotates continuously so that the cam 5 pushes the roller 40 to make the changeover means 7 move to the right. Accordingly the protuberance 31 of the sector member 28 moves downward to surface 24 to thereby push the control member 22 downwardly. When the control member 22 is pushed downward, the operating member 16 is pushed downward with the control member 22 until the uppermost end of the stroke limit hole 18 gets in contact with the guide pin 17 while the lock member 32 rotates in an anti-clockwise direction against tensile force of the spring 38 because the protuberance 34 thereof is pushed by the downward slanting surface 25 of the control member 22 (Ref. : FIG. 3).

Figure 4:
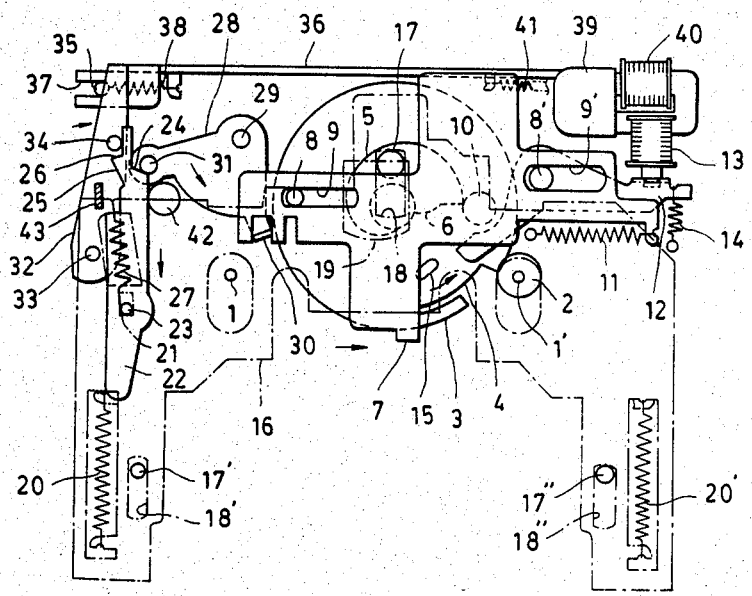
FIG. 4 is a plan view similar to FIG. 1 showing the embodiment of FIG. 1 in a further position of operation.

Even after the operating member 16 reaches the lowermost end (namely, the position where the head 19 is in an advanced position in which it is press-fit against the tape in the cassette), the control member 22 is still continuously pushed downward until the roller 10 reaches the highest position of the cam 5. At that time, the supported point 23 moves downward within the hole 21 against tensile force of the spring 27 while the lock member 32 rotates in a clockwise direction due to tensile force of the spring 38 because the protuberance 34 thereof has passed the downward slanting surface 25 (ref. : FIG. 4).

When the roller 10 passes over the highest position of the cam 5, the intermittent gear 3, when reaching such a position that the cut-out portion 4 thereof faces the gear 2, gets out of meshing engagement with gear 2 and the stopper member 12, which has returned to the stop position due to tensile force of the spring 14 because the release plunger 13 has been deenergized, engages with the protuberance 15 to hold the intermittent gear 3 there. On the other hand, the changeover member 7 moves to the left due to tensile force of the spring 11 until the roller 10 gets in contact with the step portion 6, causing the protuberance 31 of the sector member 28 to move upward. The control member 22 which is no longer subject to downward pressure by the protuberance 31 moves upward due to tensile force of the spring 27 until the upward slanting surface 26 gets in contact with the protuberance 34 of the lock member 32. Such locked condition where the upward slanting surface 26 is in contact with the protuberance is held by the holding force of the holding plunger 40 and tensile force of the spring 38. In this locked condition, the protuberance 23 of the control member 22 is locked slightly apart from the uppermost end of the hole 21, so that tensile force of the spring 27 effectively acts on the operating member 16 to surely hold it at the lowermost position (namely, the position where the head 19 is press-fit ) (ref.: FIG. 5). This locked condition is thereafter held throughout play time of the cassette tape.

In the process from FIG. 2 to FIG. 5 and in the locked condition of FIG. 5, if a user wants to do an operation requiring a release of the head, he may only deenergize the holding plunger 40. Then, the holding member 36 and the lock member 32 are released from the holding power of the holding plunger 40, so that the tensile force of the springs 20 and 20' which upwardly energize the control member 22 through the operating member 16 overcomes the tensile force of the spring 41 which energizes the control member 22 through the lock member 32 in a clockwise direction. Accordingly, the control member 22, rotating in an anti-clockwise direction in a manner avoiding the protuberance 31 of the sector member 28, moves away from the protuberance 31. At the same time, the upward slanting surface 26, pushing the protuberance 34 of the lock member 32 leftwardly so as to rotate the lock member 32 in an anti-clockwise direction, becomes disengaged from the protuberance 34 and further moves upward until the lowermost end of the stroke limit hole 18 gets in contact with the guide pin 17 (namely, until the head 19 is released) and stops there. If the holding plunger 40 is deenergized substantially in a state as shown in FIG. 3, the system changes to a state as shown in FIG. 6. And, if the motor continues rotating, the intermittent gear 3, after continuously rotating from the position as shown in FIG. 6, stops at the position as shown in FIG. 1.

In the process from FIG. 2 to FIG. 5 and in the locked condition as shown in FIG. 5, also if power source is interrupted, the operating member 16 immediately returns to its initial position to release the head 19 because the holding plunger 40 is deenergized in response to the interruption.

Although the control member 22 in the embodiment as shown in FIGS. 1 to 6 is pivotally supported in a manner movable in up and down directions with respect to the operating member 16, it may be pivotal only.

Figure 7:
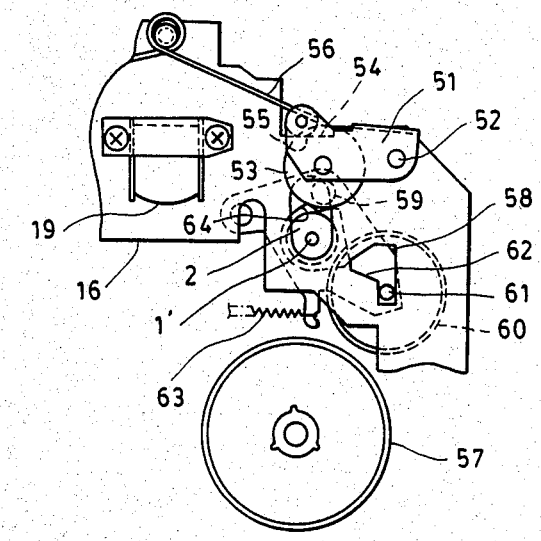
FIG. 7 is a fragmentary plan view of an alternative embodiment of the mechanism of FIG. 1.
Figure 8:
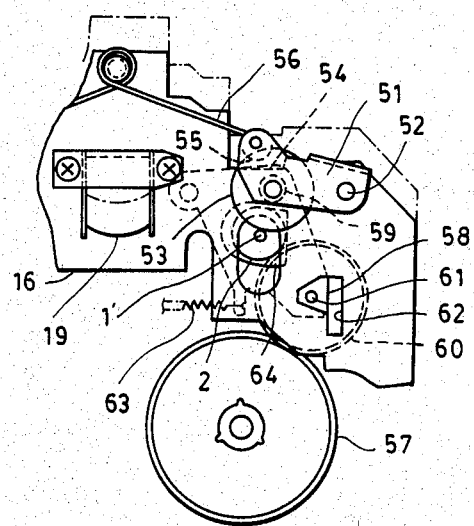
FIG. 8 is a plan view similar to FIG. 7 showing the embodiment of FIG. 7 in a different position of operation.

FIGS. 7 and 8 show a further embodiment wherein a pinch roller and an idler are also press-fit simultaneously with press-fitting action of the head. Components which are the same as in the former embodiment are designated by the same reference numerals. Further reference numeral 51 designates a pinch roller mounting frame having a support shaft 52 and pivotally mounted by the support shaft 52 on the operating member 16. The pinch roller mounting frame 51 has pivotally mounted thereon a pinch roller 53 and a roller 55 for separatively contacting with a cut-in 54 formed in the operating member 16. A spring 56 is connected with both ends thereof to the axis of the roller 55 and the operating member 16, respectively for energizing the pinch roller mounting frame 51 in an anti-clockwise direction so as to have the roller 55 abut the cut-in 54. Reference numeral 57 refers to a reel base provided on the fixture frame and 58 to an idler mounting plate pivotally supported on the fixture frame. An idler 60 is pivotally mounted on the idler mounting plate 58 and the axle 61 of the idler 60 is in a hole 62 formed in the operating member 16. Numeral 63 refers to a spring for energizing the idler mounting plate 58 in clockwise direction and 64 to a through bore formed in the idler mounting plate 58 and allowing the capstan 1' to pass through.

In this embodiment, when the operating member 16 is located at the uppermost end in FIG. 7 (namely, at the position for releasing the head 19), the roller 55 abuts the cut-in 54 to thereby position the pinch roller 53 apart from the capstan 1' and the axle 61 is in the downward extending part of the hole 62 to thereby put the idler 60 in disengagement from either of the gear 2 or the reel base 57. On the other hand, when the operating member 16 is pushed down as in the former embodiment to reach the lowermost end in FIG. 8 (namely, the position for press-fitting the head 19), the pinch roller 53 abuts the capstan 1' and the roller 55 comes apart from the cut-in 54, so that the pinch roller 53 is suppressed on the capstan 1' by the force of the spring 56. At the same time, the axle 61 falls in the enlarged upper portion of the hole 62 to thereby let the idler 60 surely get in mesh with the gear 2 and the reel base 57 due to tensile force of the spring 63. Such suppressed condition is then locked and held as in the former embodiment, and in desired cases, is released to return to the state shown in FIG. 7.

Figure 9:
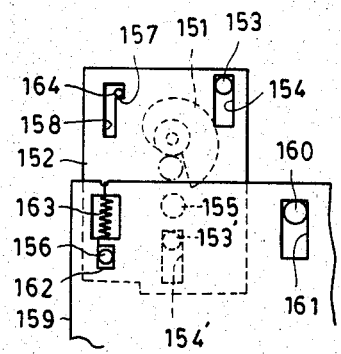
FIG. 9 is a fragmentary plan view of a further alternative embodiment of the mechanism of FIG. 1.

FIG. 9 shows a still further embodiment according to the present invention. Reference numeral 151 refers to a cam similar to the cam 5, and 154 and 154' to slots which are in engagement with pins 153 and 153', respectively, so as to permit member 152 to be movable in up and down directions. The control member 152 has thereon a roller (or a pin) 155, a protuberance 156 and a lock hole 158 having a fall-in or catch portion 157. Numeral 159 is an operating member similar to the operating member 16 having a stroke limit hole 161 for engagement with a guide pin 160 provided on the fixture frame so as to be movable in up and down direction and a hole 162 for receiving the protuberance therein movably in up and down direction therealong. Numeral 163 is a spring corresponding to the spring 27 and 164 is a lock member corresponding to the lock member 32 (particularly to its protuberance 34).

According to this embodiment, when the cam 151 rotates, the rotation is directly transmitted to the control member 152 through the protuberance 155, so that transmission between the control member 152 and the operating member 159 is performed in substantially same manner. Namely, the tensile force of the spring 163 effectively acts on the operating member 159 to surely keep it in the position for suppressing the head.

Beside these, the present invention may be put in various modifications and alterations.

As described in the above, according to the present invention so constructed as above, the operating member for shifting the head can be brought out of transmitting relation with the cam even during its action for shifting the head. Owing to this, when the power source is interrupted to stop the motor in the middle of the head shifting action of the operating member through by the cam, or when a user wants to do an operation in the middle of another kind of operation, the operating member can immediately be put in its stable position by deenergizing the electromagnetic plunger.

The embodiments of the invention in which an exclusive property or privilege is claimed are defined as follows:

1. A head shift mechanism in a magnetic tape apparatus which comprises:
   a rotatably supported gear and means for effecting rotation thereof;
   an engaging member which is movably supported and is intermittently engageable with said gear;
   a cam member which is operatively coupled to and moves simultaneously with said engaging member;
   a movably supported changeover member having means cooperable with said cam member for effecting movement of said changeover member in response to movement of said cam member;
   selectively actuable means for causing said engaging member to operatively engage said gear, said gear effecting movement of said engaging member when engaged therewith;
   an operating member which is movably supported and has a magnetic head supported thereon, said operating member and said magnetic head being movable between advanced and retracted positions;
   a control member responsive to movement of said changeover member and cooperable with said operating member, said control member effecting movement of said operating member toward said advanced position in response to movement of said changeover member;
   lock means for releasably locking said control member in a position in which it holds said magnetic head and said operating member in said advanced position; and
   selectively actuable means for causing said lock means to release said control member.

2. A head shift mechanism of claim 1, including a rotatably driven capstan, and including a pinch roller support member which is pivotally supported on said operating member and has a pinch roller rotatably supported thereon, said pinch roller being urged against said capstan when said lock means is releasably holding said control member in said position in which it holds said operating member and said magnetic head in said advanced position.

3. A head shift mechanism of claim 2, including a rotatably supported reel base, a movably supported idler mounting plate and an idler member supported on said idler mounting plate for rotation about an axle which operatively engages said operating member, wherein as said magnetic head is moved between its retracted and advanced positions said operating member moves said axle and said idler mounting plate between positions in which said idler member is respectively spaced from and operatively engaging said reel base and said gear.

4. A head shift mechanism of claim 1, wherein said release means includes electromagnetic holding means and a holding member which is cooperable with said lock means and, when said holding means is energized, is magnetically attracted by said holding means to a position in which it permits said lock means to releasably hold said control member, and including means for causing said holding member to move to a position in which it causes said lock means to release said control member when said holding means is deenergized.

5. A head shift mechanism of claim 1, wherein said engaging member is a rotatably supported gear having a cut-out in the toothed portion thereof, wherein said cam member is an approximately spiral cam surface provided on said engaging member, wherein said changeover member is supported for reciprocal movement parallel to a first direction, wherein said means on said changeover member engageable with said cam member includes a roller rotatably supported on said changeover member and engaging said cam surface, wherein said operating member is supported for reciprocal movement parallel to a second direction which is perpendicular to said first direction, wherein said control member is a lever which is pivotally supported on said operating member, including a pivotally supported, sector-shaped member which operatively couples said changeover member and said control member and which causes said control member to move said operating member toward said advanced position in response to movement of said changeover member, wherein said lock means includes a lock member pivotally supported on said operating member and having a pin engageable with a surface on said control member in a locking position of said lock member and includes means for urging said lock member toward its locking position, and wherein said release means includes means for moving said lock member away from its locking position when said holding means is deenergized so as to move said pin on said lock member out of engagement with said surface on said control member.

* * * * *